US006339839B1

(12) United States Patent
Wang

(10) Patent No.: US 6,339,839 B1
(45) Date of Patent: Jan. 15, 2002

(54) ENABLING MULTIPLE CODE GENERATORS IN A TRANSLATOR-BASED EMBEDDED SCRIPTING SYSTEM

(75) Inventor: Andy I-Shin Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/191,255

(22) Filed: Nov. 12, 1998

(51) Int. Cl.[7] .................................................. G06F 9/45
(52) U.S. Cl. ................................ 717/5; 717/6; 707/203
(58) Field of Search ....................... 717/5, 6, 7; 703/23; 704/1, 4, 8; 707/513, 203; 716/1

(56) References Cited

U.S. PATENT DOCUMENTS

| | | | | |
|---|---|---|---|---|
| 5,159,687 A | | 10/1992 | Richburg ......................... | 717/2 |
| 5,390,314 A | | 2/1995 | Swanson ......................... | 717/5 |
| 5,586,330 A | | 12/1996 | Knudsen et al. ................. | 717/5 |
| 5,623,656 A | * | 4/1997 | Lyons ............................. | 707/10 |
| 5,699,310 A | | 12/1997 | Garloff et al. .................... | 717/1 |
| 5,721,912 A | | 2/1998 | Stepczyk et al. ............. | 707/102 |
| 5,745,360 A | * | 4/1998 | Leone et al. ................. | 707/513 |
| 5,890,158 A | * | 3/1999 | House et al. .................. | 707/10 |
| 5,907,704 A | * | 5/1999 | Gudmundson et al. ......... | 717/1 |
| 5,918,010 A | * | 6/1999 | Appleman et al. .......... | 709/203 |
| 5,937,064 A | * | 8/1999 | Eick et al. .................... | 707/101 |
| 5,963,952 A | * | 10/1999 | Smith .......................... | 707/102 |
| 5,987,256 A | * | 11/1999 | Wu et al. ........................ | 717/7 |
| 5,999,944 A | * | 12/1999 | Lipkin ......................... | 707/104 |
| 6,038,590 A | * | 3/2000 | Gish ............................ | 709/203 |
| 6,074,432 A | * | 6/2000 | Guccione ....................... | 717/2 |
| 6,157,926 A | * | 12/2000 | Appleman et al. .......... | 707/102 |
| 6,233,725 B1 | * | 5/2001 | Beadle et al. ................... | 717/1 |

FOREIGN PATENT DOCUMENTS

| | | |
|---|---|---|
| DE | 196 25 834 A1 | 1/1998 |
| EP | 0 703 552 A2 | 3/1996 |
| EP | 0 784 257 A1 | 7/1997 |
| JP | 9-330212 | 12/1997 |

OTHER PUBLICATIONS

Hsieh et al, Javabytecode to native code tralslation: the caffeine prototype and preliminary results:, IEEE pp 90–97, 1996.*

Kim, "APIs for real time distributed object programming", IEEE Computer, pp 72–80, 2000.*

Nishida et al, "Distribution of Ada tasks onto a heterogenous environment", ACM, pp 155–165, 1991.*

Wallace et al, Haskell and XML: generic combinators or type based translation?, ICFP ACM pp 148–159, Sep. 1999.*

Price et al, "Natural Java: a natural language interface for programming in Java", IUI ACM pp 207–211, Aug. 2000.*

(List continued on next page.)

*Primary Examiner*—Mark R. Powell
*Assistant Examiner*—Anil Khatri
(74) *Attorney, Agent, or Firm*—Gates & Cooper LLP

(57) ABSTRACT

A translator-based embedded scripting environment includes multiple translators executed by one or more computers. An original input source is split into a plurality of intermediate sources for processing by a plurality of translators executed by one or more computers. One or more of the corresponding intermediate sources includes a class definition that contains one or more methods. Another one of the corresponding intermediate sources includes logic to instantiate the class definition as an object and logic to invoke the one or more of the methods of the object in order to maintain a sequence of execution specified in the original input source. Placeholders are used within the class definition during the translations to identify locations of file input/output operations that write data to an output destination.

45 Claims, 6 Drawing Sheets

OTHER PUBLICATIONS

IBM Technical Disclosure Bulletin, "Generating Multi–Platform Build Logic from Common Source Code," vol. 40, No. 09, Sep. 1997, 97–100.

IBM Technical Disclosure Bulletin, "Generating Event Adapters to Facilitate Connections Between Java Beans," vol. 41, No. 01, Jan. 1998, pp. 125–128.

IBM Technical Disclosure Bulletin, "Separating Strings from Standard Graphical User Interface Resources for Translation and Builds," vol. 39, No. 03, Mar. 1996, pp. 217–228.

Hammer, J. et al., "Template–Based Wrappers in the TSIMMIS System," ACM SIGMOD International Conference on Management of Data, Tuczon, Arizona, May 13–15, 1997, SIGMOND 1997, vol. 26, No. 2, Jun. 1997, pp. 532–535 (abstract—1 page).

Kolan, G., "Decompile Once, Run Anywhere—Protecting Your Java Source," WEB Techniques, vol. 2, No. 9, pp. 40–42, 44–46, Sep. 1997 (abstract—1 page).

Stevens, A., "Kicking and Scripting: JavaScript and CGI," Dobb's Journal, vol. 22, NO. 4, pp. 92–95, 97, 114, Apr. 1997 (abstract—1 page).

* cited by examiner

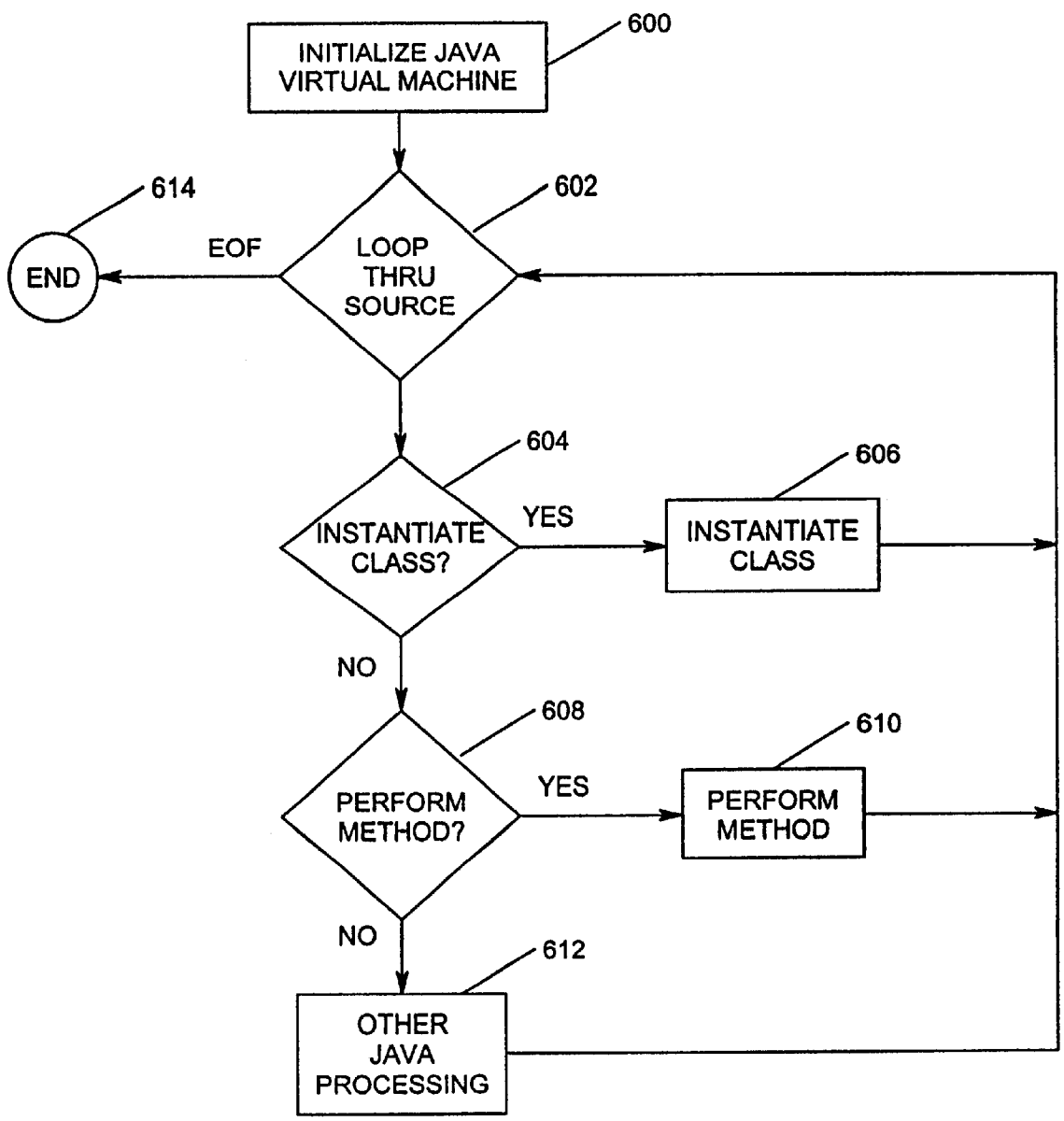

US 6,339,839 B1

ENABLING MULTIPLE CODE GENERATORS IN A TRANSLATOR-BASED EMBEDDED SCRIPTING SYSTEM

BACKGROUND OF THE INVENTION

1. Field of the Invention

This invention relates in general to generating Web content, and in particular, to a method for enabling multiple code generators in a translator-based embedded scripting system.

2. Description of Related Art

With the fast growing popularity of the Internet and the World Wide Web (also known as "WWW" or the "Web"), there is also a fast growing demand for Web development tools. A number of different tools are available, including HTML translators, Java interpreters, JavaScript translators, etc.

A translator-based embedded scripting environment usually converts the original input source containing embedded script into an equivalent script format first, such that a script engine only has to deal with a final source file. For example, when the original input source is HTML text, with or without embedded Java source, a JavaSoft Pagecompile™ translator usually converts the original input source into an equivalent Java source file, so that a Java Virtual Machine only has to interpret the Java source and not the HTML text.

However, this approach fails when there is a need to have more than one translator to process the original input source. For example, if the original input source includes non-HTML text and/or non-Java source, such as JavaScript, NetRexx, etc., a JavaSoft Pagecompile™ translator cannot convert the original input source into its equivalent Java source; instead, another translation from JavaScript, NetRexx, etc., into Java source must occur first.

The present invention solves this problem by introducing a method to allow the use of multiple code generators with an original input source.

SUMMARY OF THE INVENTION

To overcome the limitations in the prior art described above, and to overcome other limitations that will become apparent upon reading and understanding the present specification, the present invention discloses a method, apparatus, and article of manufacture for providing a translator-based embedded scripting environment that includes multiple translators, interpreters, or code generators for use with a single original input source. The original input source contains programming statements in multiple languages, and is split into multiple intermediate sources. One of the intermediate sources contains statements in a first programming language as well as placeholders identifying the locations of statements in the original input source in a second programming language. This intermediate source is translated into a class definition, wherein the placeholders are translated into file input/operations that write the statements in the original input source in the second programming language to an output destination. Another of the intermediate sources is translated into statements that instantiate the class definition as an object and then invoke the methods of the instantiated object in order to maintain a sequence of execution specified in the original input source.

BRIEF DESCRIPTION OF THE DRAWINGS

Referring now to the drawings in which like reference numbers represent corresponding parts throughout:

FIG. 6 is a flowchart illustrating the general logic performed by the Java Virtual machine according to the preferred embodiment of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention discloses a translator-based embedded scripting environment that allows the use of multiple translators, interpreters, or code generators with a single original input source. In a preferred embodiment, the original input source comprises HTML text, with or without embedded JavaScript statements. The original input source is split into two intermediate sources, wherein a first intermediate source contains Java statements and the second intermediate source contains both HTML statements and JavaScript statements. The JavaScript statements in the second intermediate source are translated into a Java class definition and the HTML statements are translated into placeholders within the Java class definition. The placeholders are then translated into Java statements within the Java class definition that perform file input/output operations to write the HTML statements from the original input source to an output destination. The Java statements of the first intermediate source instantiate the Java class definition as an object when interpreted by a Java Virtual Machine and invoke the methods of the instantiated object in order to maintain a sequence of execution specified in the original input source.

Hardware Environment

Figure 1:
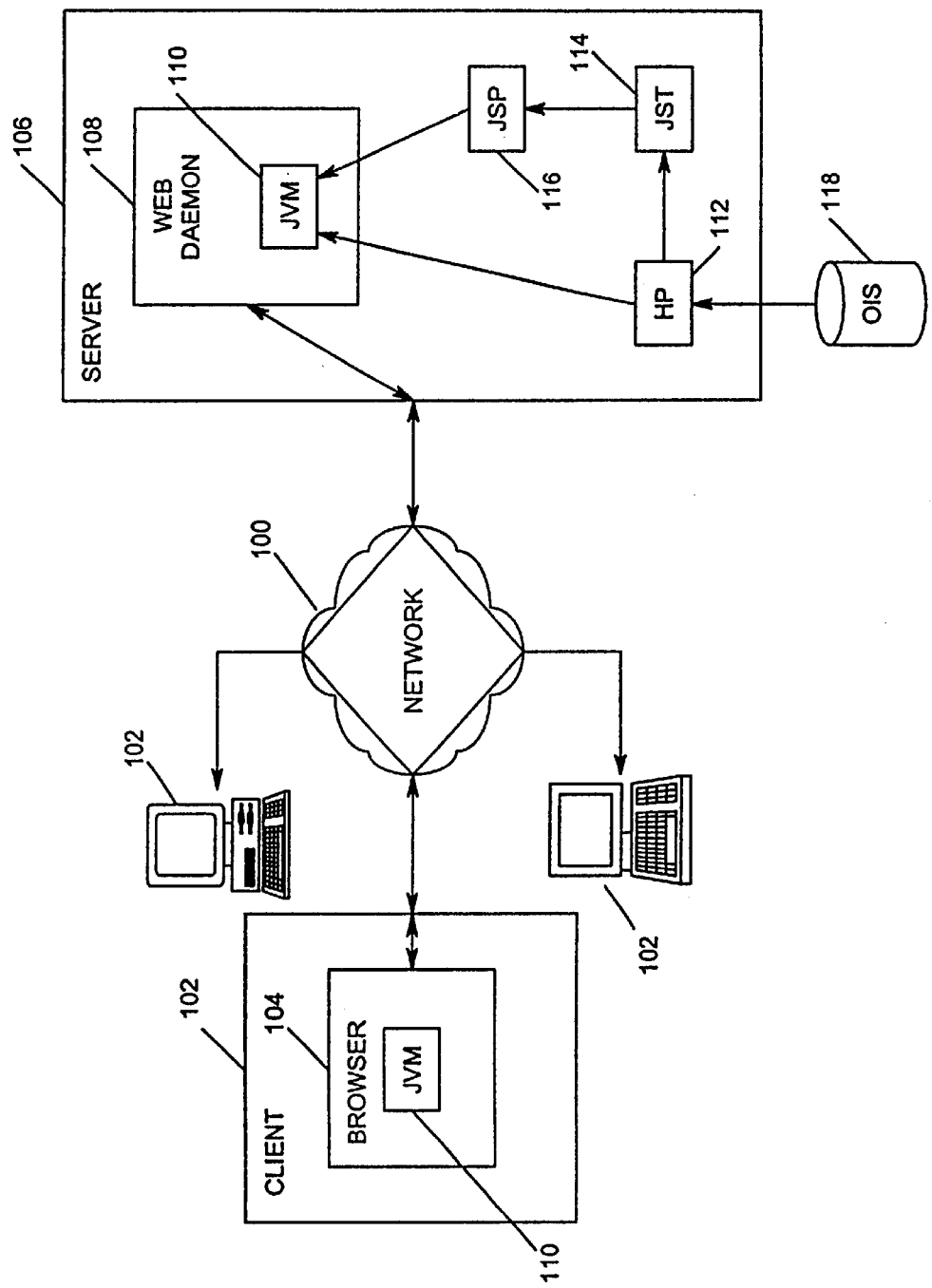
FIG. 1 is a block diagram that illustrates an exemplary client-server hardware environment of the preferred embodiment of the present invention.

FIG. 1 schematically illustrates the hardware environment of the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include other networks such as LANs, WANs, SNA networks, as well as the Internet.

Either or both of the Web browser 104 and Web daemon 108 may include a Java Virtual Machine UVM) 110 that executes Java programming statements associated with various Web content. The server system 106 may further include one or more translators 112, 114, 116 that are executed to create the Web content. In the preferred embodiment, the translators comprise an HTML Parser (HP) 112, JavaScript Translator (JST) 114, and JavaSoft Pagecompile (JSP) 116, although those skilled in the art will recognize that other translators, interpreters, or code generators could be used as well without departing from the scope of the present invention. These translators 112, 114, 116 interpret an original input source (OIS) 118 comprised of scripts, programming instructions, etc., and translate the OIS 118 into intermediate source for use by other translators 112, 114, 116 and/or the JVMs 110.

In general, the translators 112, 114, 116 comprise data and/or instructions which, when read and executed by the server computer 106, cause the computer 106 to perform the steps for performing and/or using the present invention. Generally, the data and/or instructions are embodied in and/or readable from a device, carrier or media, such as memory, data storage devices, and/or remote devices coupled to the computer via a data communications device.

However, those skilled in the art will recognize that the exemplary environment illustrated in FIG. 1 is not intended to limit the present invention. Indeed, those skilled in the art will recognize that other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

Operation of the Invention

Figure 2:
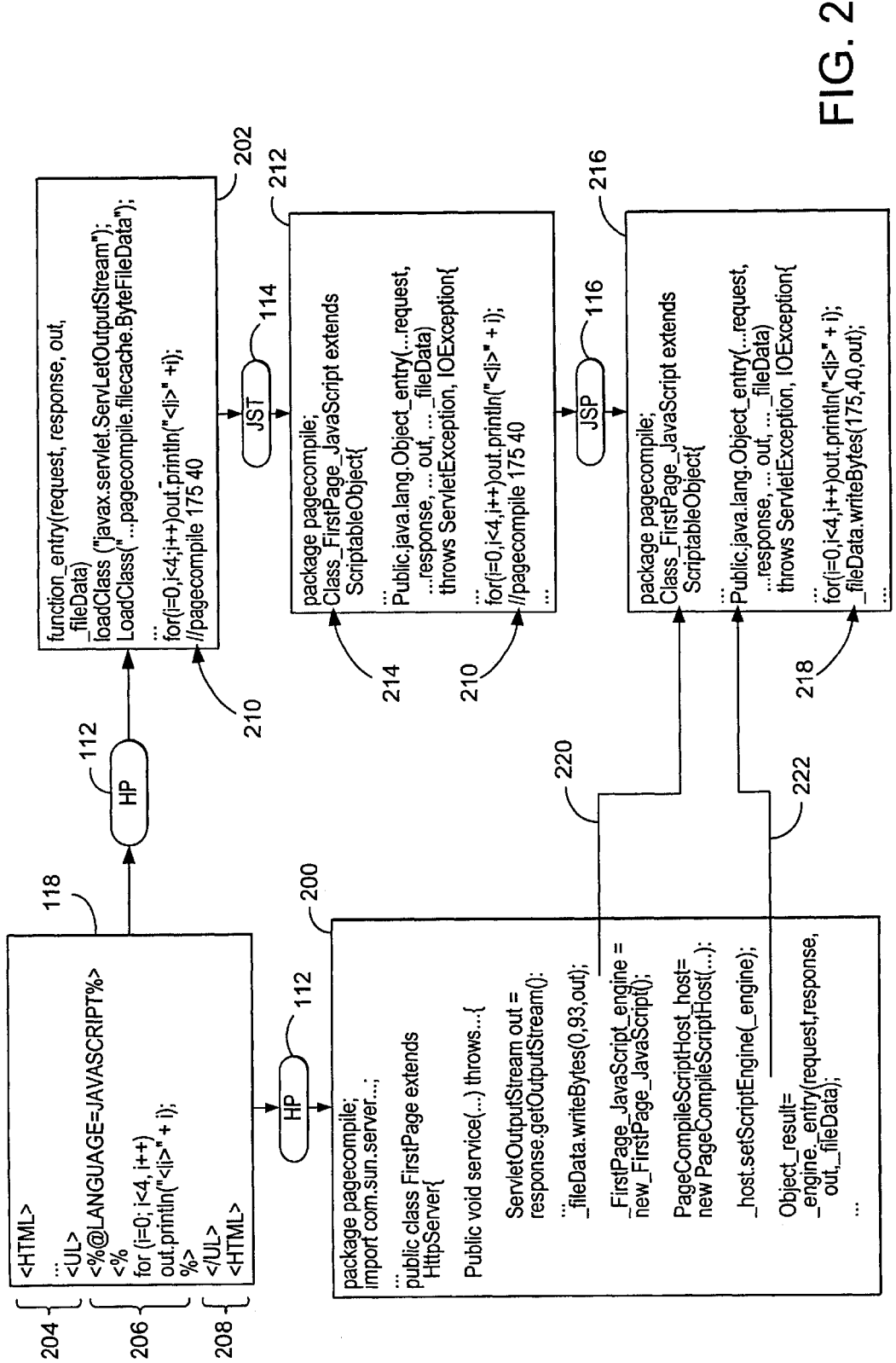
FIG. 2 is a block diagram that illustrates the operation of the preferred embodiment of the present invention.

FIG. 2 is a block diagram that illustrates one example of the operation of the present invention. In this example, the HTML Parser 112 parses the original input source 118 and generates two intermediate sources, e.g., a Java intermediate source 200 for a Java Virtual Machine 110 and a JavaScript intermediate source 202 for a JavaScript Translator (JST) 114.

To create the JavaScript intermediate source 202 for the JavaScript Translator 114, the HTML Parser 112 parses the original input source 118, skipping any HTML blocks 204 before the first JavaScript block 206, since these blocks 204 do not need to be processed by the JavaScript Translator 114. In contrast, every HTML block 208 after the first JavaScript block 206 is translated into its corresponding placeholder 210 in the JavaScript intermediate source 202, wherein the placeholder 210 is a JavaScript comment with the starting and ending line numbers of the HTML Blocks 208 in the original input source 118. The HTML Parser 112 may also generate the correct JavaScript statements to declare the variables referred to in the HTML blocks 208 to ensure that there are no JavaScript Translator 114 compilation errors.

The JavaScript Translator 114 then performs JavaScript-to-Java translations on the JavaScript intermediate source 202 to create a Java intermediate source 212 containing one or more Java class definitions 214 that encompass the logic of one or more of the JavaScript blocks 206 in the original input source 118. These Java class definitions 212 still contain the placeholders 210 for every HTML block 208 after the first JavaScript block 206 in the original input source 200.

The JavaSoft Pagecompile 116 then translates the Java intermediate source 212 into Java intermediate source 216, wherein the placeholders 210 in the Java intermediate source 212 are translated into Java statements 218 to perform file input/output operations that write the HTML blocks to the output destination (e.g., the browser 104 executed by the client computer 102).

Both the Java intermediate source 200 and the Java intermediate source 216 are provided to the Java Virtual Machine 110 for execution. The Java Virtual Machine 110 executes the Java intermediate source 200 directly, and the Java intermediate source 200, in turn, instantiates the class definition found in the Java intermediate source 216 as an object and then invokes the methods or member functions of the object.

The present invention can easily be extended to any number of code generators/translators/interpreters. The key is to use the placeholder comments to aid in the merger of functionality at the execution phase.

Logic of the HTML Parser

Figure 3:
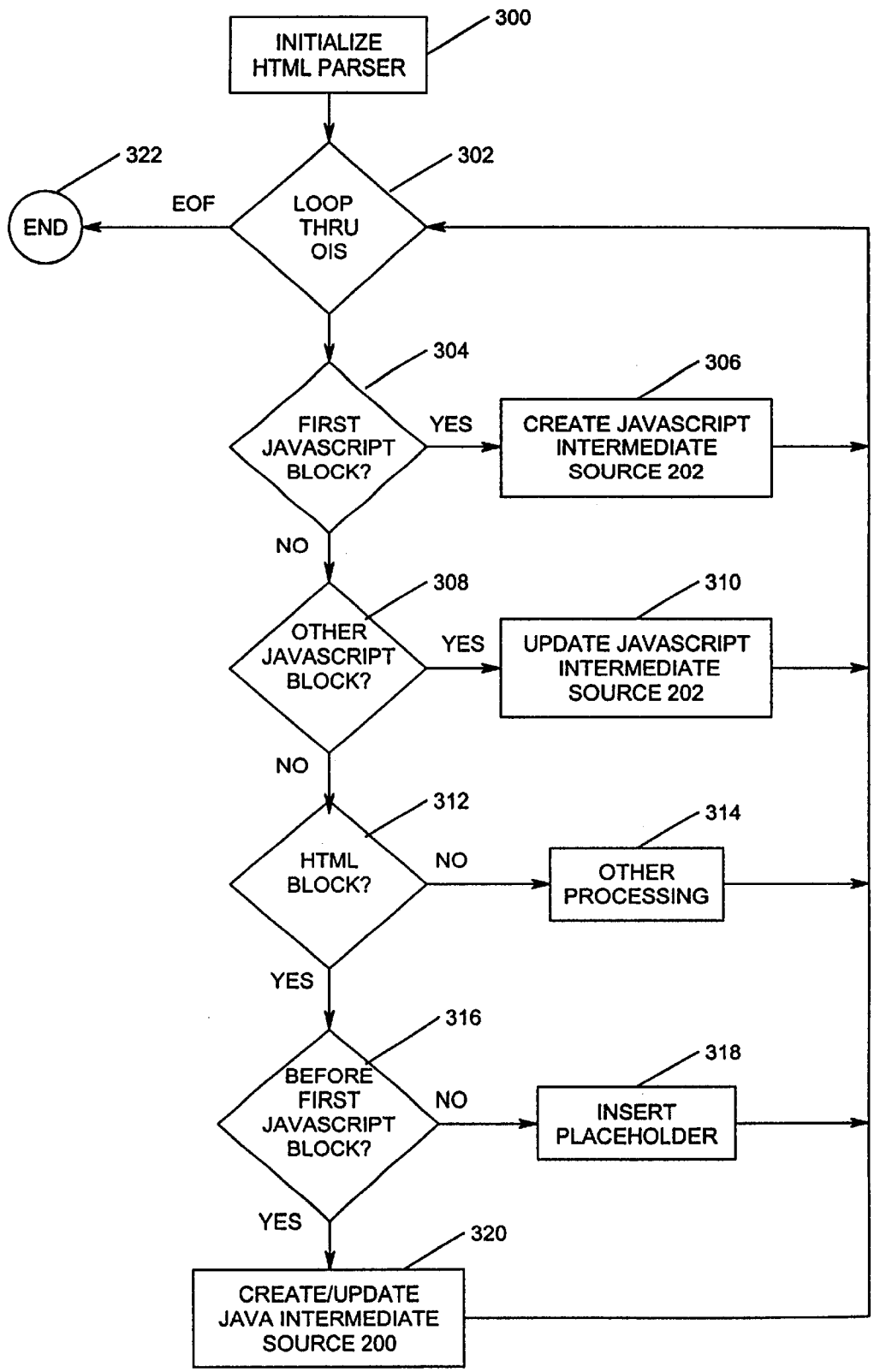
FIG. 3 is a flowchart illustrating the general logic performed by an HTML Parser according to the preferred embodiment of the present invention.

FIG. 3 is a flowchart illustrating the general logic performed by the HTML Parser 114 according to the preferred embodiment of the present invention.

Block 300 represents the HTML Parser 114 initializing upon invocation.

Blocks 302–320 represent the HTML Parser 114 looping to process all the statements in the original input source 116. Thereafter, upon end-of-file (EOF), the logic ends at Block 322.

Block 304 is a decision block that represents the HTML Parser 114 determining whether the statements retrieved from original input source 116 comprise the first JavaScript block 206. If so, control transfers to Block 306; otherwise, control transfers to Block 308.

Block 306 represents the HTML Parser 114 creating the JavaScript intermediate source 202. In addition, Block 306 represents the HTML Parser 114 setting a flag to indicate that the first JavaScript block 206 has been encountered. Thereafter, control transfers to Block 302.

Block 308 is a decision block that represents the HTML Parser 114 determining whether the statements retrieved from original input source 116 comprise other (i.e., second or later) JavaScript blocks 206. If so, control transfers to Block 310; otherwise, control transfers to Block 312.

Block 310 represents the HTML Parser 114 updating the JavaScript intermediate source 202. Thereafter, control transfers to Block 302.

Block 312 is a decision block that represents the HTML Parser 114 determining whether the statements retrieved from original input source 116 comprise HTML blocks 204 or 208. If not, control transfers to Block 314, which performs other processing; otherwise, control transfers to Block 316.

Block 316 is a decision block that represents the HTML Parser 114 determining whether the HTML block 204 or 208 retrieved from original input source 116 comprise HTML blocks 204 that occur before the first JavaScript block 206, i.e., whether the flag has been set in Block 306. If not, control transfers to Block 318; otherwise, control transfers to Block 320.

Block 318 represents the HTML Parser 114 updating the JavaScript intermediate source 202, wherein the HTML Parser 112 adds a placeholder 210 for the HTML Blocks 208 that occur after the first JavaScript block 206. This placeholder comprises a JavaScript comment with the starting and ending line numbers of the HTML Block 208 in the original input source 118. Thereafter, control transfers to Block 302.

Block 320 represents the HTML Parser 114 creating/updating the Java intermediate source 200 to contain any HTML Blocks 204 that occur in the original input source 118 before the first JavaScript Block 206. Thereafter, control transfers to Block 302.

Logic of the Javascript Translator

Figure 4:
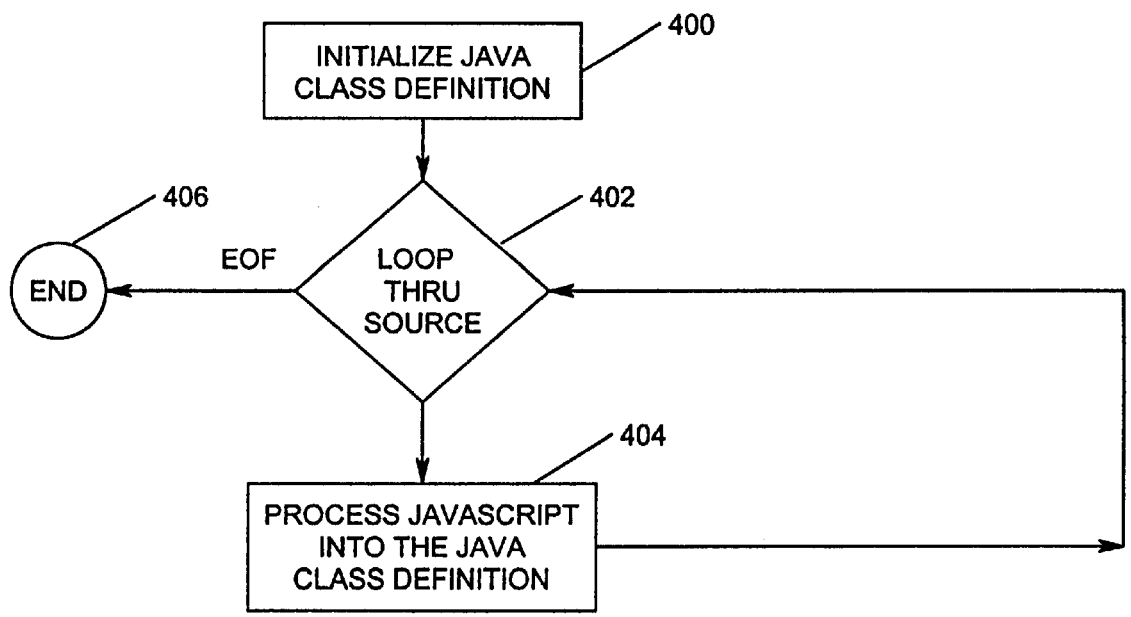
FIG. 4 is a flowchart illustrating the general logic performed by a JavaScript Translator according to the preferred embodiment of the present invention.

FIG. 4 is a flowchart illustrating the general logic performed by the JavaScript Translator (JST) 114 according to the preferred embodiment of the present invention.

Block 400 represents the JavaScript Translator 114 initializing upon invocation.

Blocks 402–404 represent the JavaScript Translator 114 looping to process all the statements in the JavaScript intermediate source 202. Thereafter, upon end-of-file (EOF), the logic ends at Block 406.

Block 404 represents the JavaScript Translator 114 performing JavaScript-to-Java translations on the JavaScript source 202 to create a Java intermediate source 212 containing one or more Java class definitions 214 that encompass the logic of one or more of the JavaScript blocks 206 in the original input source 118. These Java class definitions 212 still contain the placeholders 210 for every HTML block 208 after the first JavaScript block 206 in the original input source 200. Thereafter, control returns to Block 402.

Logic of the Javasoft Pagecompile

Figure 5:
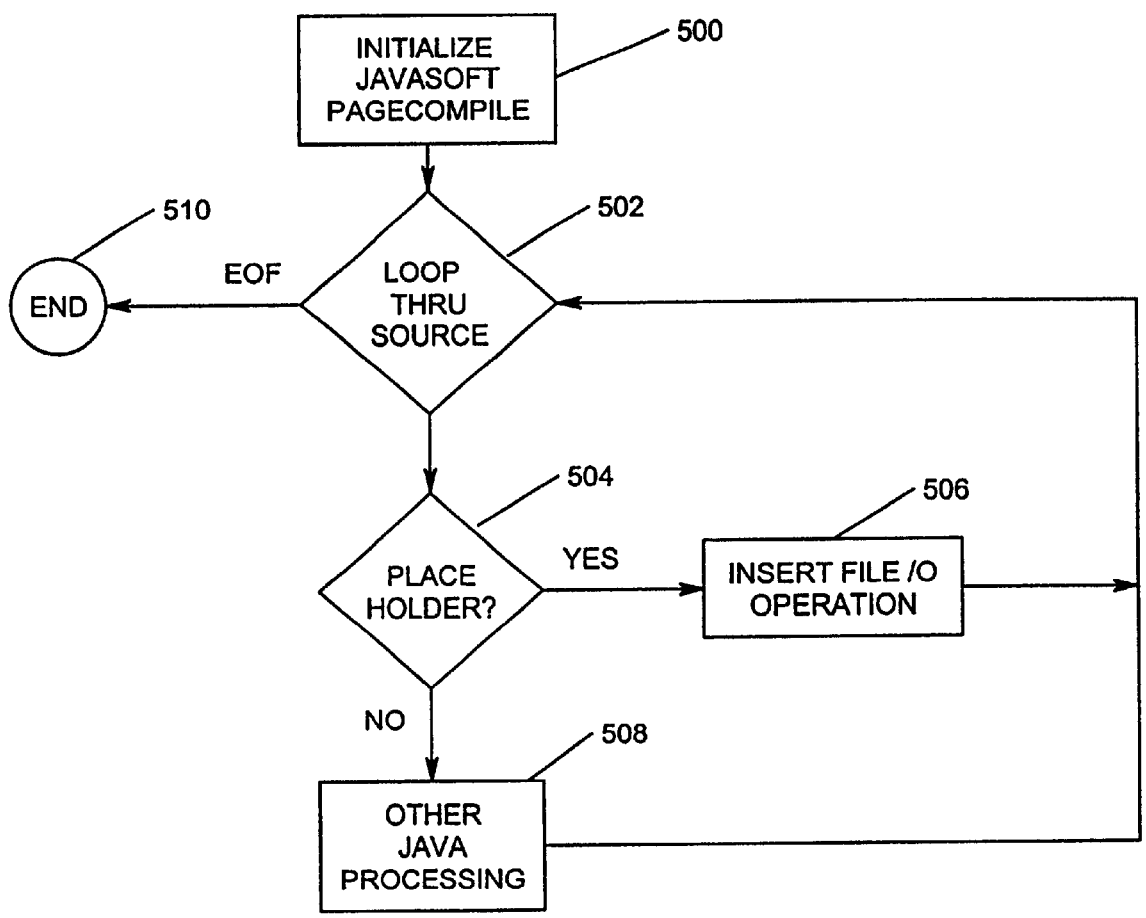
FIG. 5 is a flowchart illustrating the general logic performed by a JavaSoft Pagecompile according to the preferred embodiment of the present invention.

FIG. 5 is a flowchart illustrating the general logic performed by the JavaSoft Pagecompile 116 according to the preferred embodiment of the present invention.

Block 500 represents the JavaSoft Pagecompile 116 initializing upon invocation.

Blocks 502–508 represent the JavaSoft Pagecompile 116 looping to process all the statements in the Java intermediate source 212, i.e., translating the Java intermediate source 212 into Java intermediate source 216. Thereafter, upon end-of-file (EOF), the logic ends at Block 510.

Block 504 is a decision block that represents the Javasoft Pagecompile 116 determining whether the statements retrieved from Java intermediate source 212 comprise the placeholder 210 for HTML Blocks 206. If so, control transfers to Block 506; otherwise, control transfers to Block 508.

Block 506 represents the JavaSoft Pagecompile 116 processing the placeholder 210, i.e., translating the placeholder 210 into one or more Java statements to perform file input/output operations 218 that write the HTML blocks 206 to the output destination (e.g., the browser 104 executed by the client computer 102). Thereafter, control returns to Block 502.

Block 508 represents the JavaSoft Pagecompile 116 further processing the Java intermediate source 212. Thereafter, control returns to Block 502.

Logic of the Java Virtual Machine

FIG. 6 is a flowchart illustrating the general logic performed by the Java Virtual Machine 110 according to the preferred embodiment of the present invention.

Block 600 represents the Java Virtual Machine 110 initializing upon invocation.

Blocks 602–612 represent the Java Virtual Machine 110 looping to process all the statements in the Java intermediate source 200. Thereafter, upon end-of-file (EOF), the logic ends at Block 614.

Block 604 is a decision block that represents the Java Virtual Machine 110 determining whether the statements retrieved from Java intermediate source 200 comprise the instructions to instantiate the class definition from the Java intermediate source 216. If so, control transfers to Block 606; otherwise, control transfers to Block 608.

Block 606 represents the Java Virtual Machine 110 instantiating the class definition from the Java intermediate source 216 as an object. Thereafter, control returns to Block 602.

Block 608 is a decision block that represents the Java Virtual Machine 110 determining whether the statements retrieved from Java intermediate source 200 comprise the instructions to invoke a method or member function of the object instantiated from the class definition from the Java intermediate source 216. If so, control transfers to Block 610; otherwise, control transfers to Block 612.

Block 610 represents the Java Virtual Machine 110 performing the method or member function of the object instantiated from the class definition from the Java intermediate source 216.

Block 612 represents the Java Virtual Machine 110 further processing the Java intermediate source 200. At this Block, the Java Virtual Machine 110 performs Java source interpretation, translates HTML blocks, etc. Thereafter, control returns to Block 602.

Conclusion

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by specific programming languages, and could comprise languages other than HTML, JavaScript, and Java. For example, the present invention could also be used with NetRexx, VisualBasic Script, XML, Perl, C, C++, Cobol, etc.

In summary, the present invention discloses a method, apparatus, and article of manufacture for providing a translator-based embedded scripting environment that includes multiple translators, interpreters, or code generators for use with a single original input source. The original input source contains programming statements in multiple languages, and is split into multiple intermediate sources. One of the intermediate sources contains statements in a first programming language as well as placeholders identifying the locations of statements in the original input source in a second programming language. This intermediate source is translated into a class definition, wherein the placeholders are translated into file input/operations that write the statements in the original input source in the second programming language to an output destination. Another of the intermediate sources is translated into statements that instantiate the class definition as an object and then invoke the methods of the instantiated object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A translator-based embedded scripting environment, comprising:
   (a) one or more computers; and
   (b) a plurality of translators, executed by one or more of the computers, for processing their respective corresponding intermediate sources derived from an original input source, wherein one or more of the corresponding intermediate sources includes a class definition that encompasses logic of the original input source and another one of the corresponding intermediate sources includes logic to instantiate the class definition as an object in order to maintain a sequence of execution specified in the original input source.

2. The translator-based embedded scripting environment of claim 1, wherein one of the intermediate sources derived from an original input source contains one or more placeholders.

3. The translator-based embedded scripting environment of claim 2, wherein the original input source consisting of HTML text and JavaScript statements.

4. The translator-based embedded scripting environment of claim 3, wherein the placeholders identify the HTML text in the original input source.

5. The translator-based embedded scripting environment of claim 4, wherein the placeholders comprise one or more script comments.

6. The translator-based embedded scripting environment of claim 4, wherein the script comments identify a location of the HTML text within the original input source.

7. The translator-based embedded scripting environment of claim 3, wherein the placeholders are translated into file input/operations.

8. The translator-based embedded scripting environment of claim 7, wherein the file input/output operations write the HTML text to an output destination.

9. The translator-based embedded scripting environment of claim 1, wherein the respective corresponding intermediate sources comprise programming statements selected from a group consisting of HTML, JavaScript, and Java.

10. The translator-based embedded scripting environment of claim 9, wherein one of the translators translates the original input source into Java statements.

11. The translator-based embedded scripting environment of claim 9, wherein one of the translators translates the original input source into JavaScript statements with placeholders indicating HTML text.

12. The translator-based embedded scripting environment of claim 11, wherein the placeholders identify a location of the HTML text in the original input source.

13. The translator-based embedded scripting environment of claim 12, wherein one of the translators translates the JavaScript statements into a Java class definition and one or more methods within the Java class definition.

14. The translator-based embedded scripting environment of claim 13, wherein one of the translators translates the placeholders into file input/output operations within the Java class definition.

15. The translator-based embedded scripting environment of claim 14, wherein the file input/output operations write the HTML text to an output destination.

16. A method of processing scripts in a translator-based embedded scripting environment, comprising the steps of:
   (a) processing an original input source to create respective corresponding intermediate sources for a plurality of translators executed by one or more computers, wherein one or more of the corresponding intermediate sources includes a class definition that encompasses logic of the original input source and another one of the corresponding intermediate sources includes logic to instantiate the class definition as an object in order to maintain a sequence of execution specified in the original input source; and
   (b) executing the intermediate source files in one or more of the computers.

17. The method of claim 16, wherein one of the intermediate sources derived from an original input source contains one or more placeholders.

18. The method of claim 17, wherein the original input source comprises HTML text and JavaScript statements.

19. The method of claim 18, wherein the placeholders identify the HTML text in the original input source.

20. The method of claim 19, wherein the placeholders comprise one or more script comments.

21. The method of claim 19, wherein the script comments identify a location of the HTML text within the original input source.

22. The method of claim 18, wherein the placeholders are translated into file input/operations.

23. The method of claim 22, wherein the file input/output operations write the HTML text to an output destination.

24. The method of claim 16, wherein the respective corresponding intermediate sources comprise programming statements selected from a group consisting of HTML, JavaScript, and Java.

25. The method of claim 24, wherein one of the translators translates the original input source into Java statements.

26. The method of claim 24, wherein one of the translators translates the original input source into JavaScript statements with placeholders indicating HTML text.

27. The method of claim 26, wherein the placeholders identify a location of the HTML text in the original input source.

28. The method of claim 27, wherein one of the translators translates the JavaScript statements into a Java class definition and one or more methods within the Java class definition.

29. The method of claim 28, wherein one of the translators translates the placeholders into file input/output operations within the Java class definition.

30. The method of claim 29, wherein the file input/output operations write the HTML text to an output destination.

31. An article of manufacture embodying logic for performing a method of processing scripts in a translator-based embedded scripting environment, the method comprising the steps of:
   (a) processing an original input source to create respective corresponding intermediate sources for a plurality of translators executed by one or more computers, wherein one or more of the corresponding intermediate sources includes a class definition that encompasses logic of the original input source and another one of the corresponding intermediate sources includes logic to instantiate the class definition as an object in order to maintain a sequence of execution specified in the original input source; and
   (b) executing the intermediate source files in one or more of the computers.

32. The method of claim 31, wherein one of the intermediate sources derived from an original input source contains one or more placeholders.

33. The method of claim 32, wherein the original input source consisting of HTML text and JavaScript statements.

34. The method of claim 33, wherein the placeholders identify the HTML text in the original input source.

35. The method of claim 34, wherein the placeholders comprise one or more script comments.

36. The method of claim 34, wherein the script comments identify a location of the HTML text within the original input source.

37. The method of claim 33, wherein the placeholders are translated into file input/operations.

38. The method of claim 37, wherein the file input/output operations write the HTML text to an output destination.

39. The method of claim 31, wherein the respective corresponding intermediate sources comprise programming statements selected from a group consisting of HTML, JavaScript, and Java.

40. The method of claim 39, wherein one of the translators translates the original input source into Java statements.

41. The method of claim 39, wherein one of the translators translates the original input source into JavaScript statements with placeholders indicating HTML text.

42. The method of claim 41, wherein the placeholders identify a location of the HTML text in the original input source.

43. The method of claim 42, wherein one of the translators translates the JavaScript statements into a Java class definition and one or more methods within the Java class definition.

44. The method of claim 43, wherein one of the translators translates the placeholders into file input/output operations within the Java class definition.

45. The method of claim 44, wherein the file input/output operations write the HTML text to an output destination.

* * * * *